United States Patent [19]

Jung et al.

[11] Patent Number: 5,246,628

[45] Date of Patent: Sep. 21, 1993

[54] METAL OXIDE GROUP THERMISTOR MATERIAL

[75] Inventors: Hyung J. Jung, Seoul; Sang O. Yoon, Kangwon; Ki Y. Hong; Jeon K. Lee, both of Seoul, all of Rep. of Korea

[73] Assignee: Korea Institute of Science & Technology, Rep. of Korea

[21] Appl. No.: 6,697

[22] Filed: Jan. 21, 1993

Related U.S. Application Data

[63] Continuation of Ser. No. 645,126, Jan. 24, 1991, abandoned.

[30] Foreign Application Priority Data

Aug. 16, 1990 [KR] Rep. of Korea ............ 12585/1990

[51] Int. Cl.$^5$ ............................................. H01B 1/06
[52] U.S. Cl. ................................... 252/519; 252/520; 501/134; 501/136; 338/22 R
[58] Field of Search .......... 252/519, 520; 338/22 R, 338/225 D; 501/134, 136

[56] References Cited

U.S. PATENT DOCUMENTS 3,015,633 1/1962 Humbert et al. .................. 252/519
4,347,166 8/1982 Tosaki et al. ..................... 252/518
4,891,158 1/1990 Hata ................................. 252/519

Primary Examiner—Mark L. Bell
Assistant Examiner—Chris Gallo
Attorney, Agent, or Firm—Ostrolenk, Faber, Gerb & Soffen

[57] ABSTRACT

Metal oxide group NTC theremistor material made from $MnCO_3 + NiO + CuO + Co_3O_4 + FeO_3\ TiO_2$ group as a basic composition. The invention is characterized by metal oxide group thermistor material made from $MnCO_3 + NiO + ZnO + Co_3O_4 + Fe_2O_3 + TiO_2$ group or $MnCO_3 + NiO + CuO + ZnO + Fe_2O_3 + TiO_2$ group as a basic composition having respectively composition amounts by weight for each ingredient described in the text. According to the invention, the sintering temperature of the material can be reduced relative to the conventional material, and therefore there is advantage that manufacturing expense of the thermistor can be reduced.

3 Claims, 2 Drawing Sheets

METAL OXIDE GROUP THERMISTOR MATERIAL

This is a continuation of application Ser. No. 07/645,126 filed on Jan. 24, 1991 now abandoned.

BACKGROUND OF THE INVENTION

The present invention relates to a NTC thermistor material which is made using $MnCO_3$—NiO—CuO—ZnO—$Co_3O_4$—$Fe_2O_3$—$TiO_2$ as the basic composition.

Generally, a thermistor is a kind of semiconductor which exhibits very great and non-linear resistance variation in response to temperature change, and which is manufactured by mixing oxides of iron, nickel, manganese, molybdenum, and cobalt and then sintering thereof.

The metal oxide group thermistor manufactured using a transition metal oxide is a semiconductor element in which the electric resistance decreased exponentially in response to temperature change. Since there is a great difference in crystal structure and sintering characteristics in accordance with its raw material ingredients or sintering temperature, it exhibits a great difference in standard temperature resistance and resistance variation in response to temperature.

Such metal oxide group thermistors are widely used as a temperature sensing element, temperature compensating and controlling elements, as an essential element of various precision measuring and analyzing instruments including voltage controlling elements.

In conventional metal oxide group thermistor material, the manganese-nickel-cobalt-copper group which is a spinel group and the iron-titanium group which is a hematite group are generally used. In the case of former spinel group thermistor, it exhibits a wide resistance range and great B constant according to its composition, and therefore it is widely used. [Ref.: 1. Thermistors (ed. by E. D. Macklen), Electrochemical Pub., Ayr. Scotland (1979). 2. Semiconducting temperature sensors and their application (e. by H. B. Sachse), John and Wiley, New York (1975). 3. Ceramic Materials for electronics (ed. by R. C. Buchanan), Marcel Dekker, New York (1986)].

However, in making the manganese-nickel-cobalt-copper group thermistor, the price of cobalt oxide is very high, which results in a disadvantage in manufacturing cost. Also when copper oxide is absorbed, it has problem of generation of environmental pollution during manufacturing of the thermistor [Ref.: Hawley's condensed chemical dictionary, 11th edition (ed. by N. L. Sax and R. J. Lewis, Sr.), Van Nostrand Reinhold Co., New York (1987)].

SUMMARY OF THE INVENTION

Therefore, it is an object of the present invention to provide a metal oxide group thermistor material in which the higher priced cobalt oxide is replaced by lower priced iron oxide and titanium oxide whereby the manufacturing cost of thermistor material is decreased while copper oxide is replaced by harmless zinc oxide so that problem of environmental pollution upon manufacturing of thermistor material is eliminated, and at the same time liquid phase sintering is induced by eutectic reaction existing in multi-ingredient oxide group whereby the sintering temperature is lowered so that a thermistor having good characteristics can be manufactured with less manufacturing cost.

DETAILED DESCRIPTION OF THE INVENTION

The composition of the metal oxide group thermistor material of the present invention is made from a manganese carbonate $MnCO_3$+b nickel oxide NiO+c copper oxide CuO+d zinc oxide ZnO+e cobalt oxide $Co_3O_4$+f iron oxide $Fe_2O_3$+g titanium oxide $TiO_2$ as a basic composition, and the composition ratio by weight is as follows:

$$29 \leq a+b \leq 66$$

$$0 \leq c+d \leq 48$$

$$0 \leq e+f+g \leq 54$$

(provided that, $a+b+c+d+e+f+g=100$).

Figure 1:
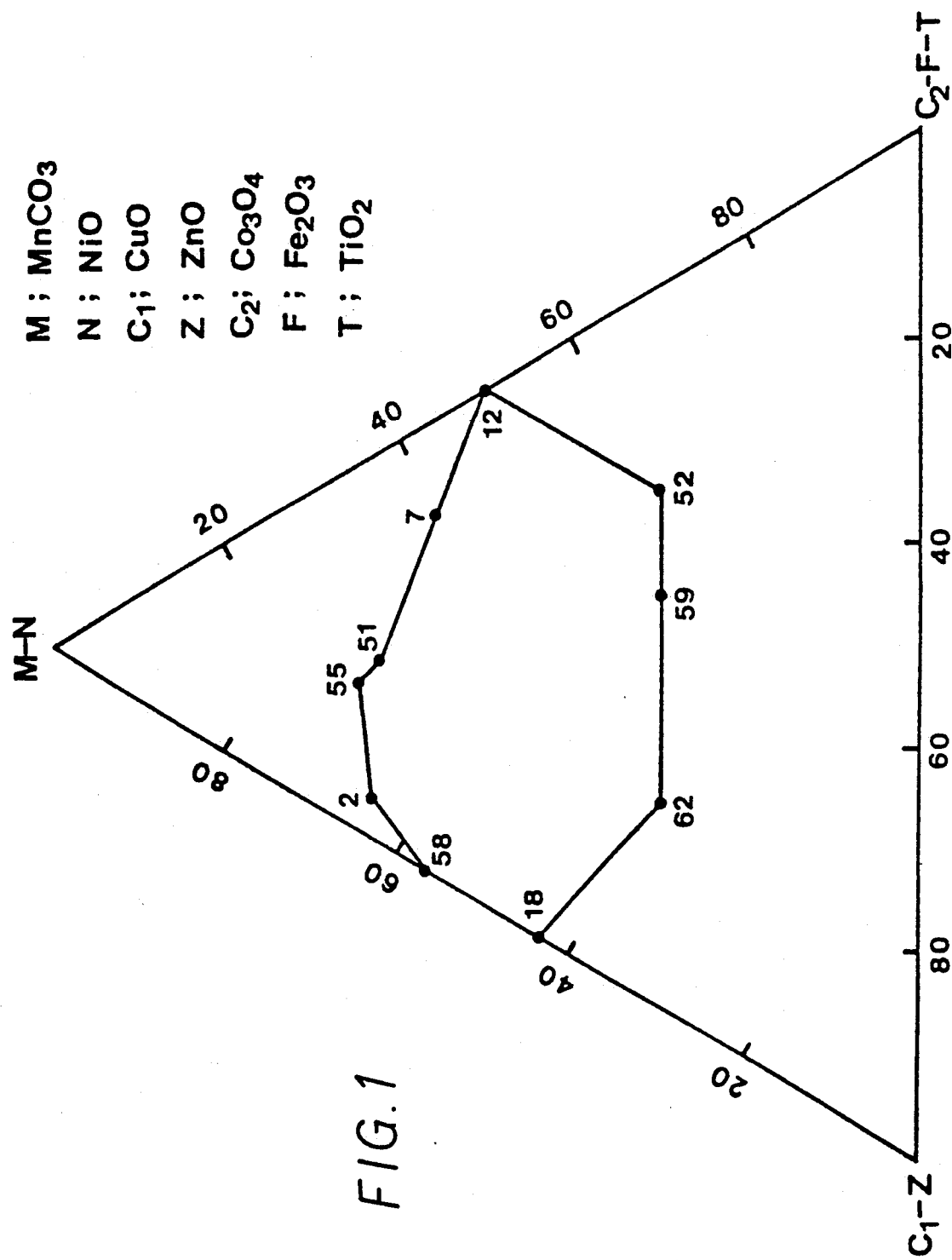
FIG. 1 is a tertiary system diagram illustrating the composition ratio of metal oxide group thermistor material according to the present invention.

The composition of the metal oxide group thermistor material of the present invention expressed by a tertiary system diagram is FIG. 1.

The process for manufacturing a NTC thermistor utilizing the metal oxide group thermistor material of the present invention is the oxide mixing method which is widely used.

Hereinafter, the manufacturing process of the thermistor will be described with reference to a preferred embodiment of the present invention.

Firstly, the manganese-nickel-zinc-cobalt-iron-titanium metal oxide combinations shown in table 1, in which $27.86 \leq a \leq 49.52$, $6.17 \leq b \leq 10.97$, $0 \leq d \leq 48.25$, $0 \leq e 8.97$, $5.08 \leq f \leq 51.14$, $0.29 \leq g 3.08$ (provided that, $a+b+d+e+f+g=100$), and the manganese-nickel-zinc-copper-cobalt-iron-titanium metal oxide combinations shown in below table 2, in which $21.86 \leq a \leq 53.68$, $7.14 \leq b \leq 13.56$, $0.44 c \leq 50.76$, $0 \leq d \leq 35.05$, $0 \leq e \leq 30.61$, $0 \leq f \leq 38.26$, $0 \leq g \leq 7.71$ (provided that, $a+b+c+d+e+f+g=100$), were made. Manganese carbonate, nickel oxide, copper oxide, zinc oxide, cobalt oxide, iron oxide and titanium oxide are respectively weighed accurately up to $10^{-4}$ g and then they are mixed and milled sufficiently together with distilled water within a zirconia ball mill.

As raw material those compounds which form the to oxide through calcination process can also be used, that is, raw material can be a with hydroxide and carbonate and the like.

The sample resulting from the mixing and milling is calcinated at 750° C.-850° C. and then a general binding agent such as PVA aqueous solution is added in small quantity and pressed and formed at pressure of 1 ton/cm² and thereafter placed on alumina plate and sintering within an electric furnace at the temperature of 1000° C.-1200° C. for two hours. Upon sintering, in order to volatilize organic substances including binding agent, it is maintained at 600° C. for one hour, and the heating and cooling sped is set at 300° C./hr.

Thereafter, a silver paste is screen printed on both surfaces of the sintered material whereby electrodes are formed, and then it is exposed to 550° C. for ten minutes and stored for 24 hours. Then the electrical characteristics are measured. Measuring of electrical characteristic of the sample is carried out by means of two-terminal method within a silicone oil thermostat maintained at 25° C., and the B constant is calculated by:

$$B = \frac{n(R_{85°\,C.}/R_{25°\,C.})}{1/358.156 - 1/298.155}$$

TABLE 1

Composition and characteristic of manganese-nickel-zinc-cobalt-iron-titanium group metal oxide thermistor

| Examples | Composition (wt %) | | | | | | | Resistivity (25° C.) (ohm·cm) | B constant (°K.) | Sintering temperature (°C.) |
| --- | --- | --- | --- | --- | --- | --- | --- | --- | --- | --- |
|  | a | b | c | d | e | f | g |  |  |  |
| Example 1 | 30.61 | 6.78 | 0.00 | 47.02 | 0.00 | 14.74 | 0.85 | 13862 | 3493 | 1150 |
| Example 3 | 36.75 | 8.14 | 0.00 | 48.25 | 0.00 | 6.51 | 0.35 | 20813 | 3890 | 1150 |
| Example 4 | 41.32 | 9.15 | 0.00 | 39.78 | 0.00 | 9.38 | 0.37 | 45160385 | 4858 | 1200 |
| Example 5 | 37.63 | 8.34 | 0.00 | 0.00 | 0.00 | 51.14 | 2.89 | 15433 | 3768 | 1050 |
| Example 6 | 41.41 | 9.95 | 0.00 | 43.27 | 0.00 | 5.08 | 0.29 | 8835727 | 4920 | 1200 |
| Example 7 | 45.46 | 10.07 | 0.00 | 35.93 | 2.05 | 6.14 | 0.35 | 347539 | 4241 | 1200 |
| Example 8 | 35.88 | 7.92 | 0.00 | 40.62 | 2.13 | 12.74 | 0.71 | 1172207 | 4601 | 1200 |
| Example 9 | 35.13 | 7.75 | 0.00 | 39.77 | 4.17 | 12.48 | 0.70 | 210 | 2710 | 1050 |
| Example 10 | 41.85 | 9.28 | 0.00 | 0.00 | 4.66 | 41.86 | 2.35 | 66 | 1482 | 1050 |
| Example 11 | 40.75 | 10.89 | 0.00 | 1.27 | 4.68 | 40.04 | 2.36 | 320835 | 4424 | 1050 |
| Example 12 | 41.43 | 9.18 | 0.00 | 1.68 | 4.80 | 40.48 | 2.42 | 113294 | 4098 | 1150 |
| Example 13 | 41.18 | 9.12 | 0.00 | 2.81 | 4.90 | 39.59 | 2.40 | 844 | 2218 | 1000 |
| Example 14 | 41.01 | 9.08 | 0.00 | 3.37 | 4.95 | 39.09 | 2.50 | 304 | 1974 | 1050 |
| Example 15 | 40.79 | 9.04 | 0.00 | 4.23 | 5.02 | 38.39 | 2.53 | 194 | 2500 | 1000 |
| Example 16 | 40.44 | 8.96 | 0.00 | 5.66 | 5.14 | 37.22 | 2.58 | 1587 | 3249 | 1050 |
| Example 17 | 39.71 | 8.79 | 0.00 | 8.56 | 5.38 | 34.84 | 2.72 | 86 | 2210 | 1050 |
| Example 18 | 35.61 | 7.89 | 0.00 | 0.00 | 5.38 | 48.38 | 2.73 | 24544 | 3758 | 1050 |
| Example 19 | 38.89 | 8.61 | 0.00 | 37.44 | 5.88 | 8.83 | 0.35 | 9817475 | 4980 | 1200 |
| Example 20 | 37.47 | 8.29 | 0.00 | 17.55 | 6.13 | 27.48 | 3.08 | 2611 | 3354 | 1050 |
| Example 21 | 37.43 | 8.28 | 0.00 | 17.79 | 6.15 | 27.30 | 3.06 | 2945243 | 4730 | 1200 |
| Example 22 | 37.38 | 8.27 | 0.00 | 18.03 | 6.17 | 27.12 | 3.03 | 22 | 1064 | 1050 |
| Example 23 | 37.20 | 8.23 | 0.00 | 19.01 | 6.26 | 26.38 | 2.92 | 714712 | 4394 | 1050 |
| Example 24 | 36.28 | 8.01 | 0.00 | 37.69 | 6.70 | 10.71 | 0.61 | 4319689 | 4860 | 1200 |
| Example 25 | 36.29 | 8.02 | 0.00 | 24.04 | 6.72 | 22.61 | 2.32 | 858 | 3077 | 1000 |
| Example 26 | 34.90 | 7.70 | 0.00 | 37.96 | 7.40 | 11.40 | 0.64 | 2405281 | 4687 | 1200 |
| Example 27 | 36.62 | 8.10 | 0.00 | 19.21 | 7.56 | 25.68 | 2.83 | 565487 | 4422 | 1150 |
| Example 28 | 33.72 | 7.44 | 0.00 | 38.18 | 8.00 | 11.98 | 0.66 | 43 | 1800 | 1000 |
| Example 29 | 36.05 | 7.97 | 0.00 | 19.41 | 8.83 | 25.00 | 2.74 | 263108 | 4208 | 1050 |
| Example 30 | 27.86 | 6.17 | 0.00 | 42.81 | 8.97 | 13.42 | 0.77 | 15688 | 3723 | 1050 |

TABLE 2

Composition and characteristic of manganese-nickel-zinc-cobalt-iron-titanium group metal oxide thermistor

| Examples | Composition (wt %) | | | | | | | Resistivity (25° C.) (ohm·cm) | B constant (°K.) | Sintering temperature (°C.) |
| --- | --- | --- | --- | --- | --- | --- | --- | --- | --- | --- |
|  | a | b | c | d | e | f | g |  |  |  |
| Example 31 | 49.46 | 10.96 | 0.44 | 34.68 | 0.55 | 3.71 | 0.20 | 243866 | 4230 | 1150 |
| Example 32 | 49.43 | 10.95 | 0.63 | 34.47 | 0.79 | 3.53 | 0.20 | 916952 | 4401 | 1200 |
| Example 33 | 48.95 | 10.98 | 4.34 | 30.41 | 5.45 | 0.00 | 0.00 | 6970 | 3561 | 1050 |
| Example 34 | 45.45 | 10.08 | 5.17 | 35.05 | 0.00 | 4.02 | 0.23 | 452 | 2663 | 1000 |
| Example 35 | 46.14 | 10.23 | 5.71 | 33.97 | 0.00 | 3.74 | 0.21 | 223838 | 4121 | 1050 |
| Example 36 | 46.98 | 10.24 | 8.40 | 31.16 | 0.00 | 3.04 | 0.18 | 332223 | 4436 | 1150 |
| Example 37 | 47.28 | 10.49 | 9.02 | 30.20 | 0.00 | 2.85 | 0.16 | 4319689 | 4563 | 1200 |
| Example 38 | 47.72 | 10.58 | 9.95 | 29.03 | 0.00 | 2.57 | 0.15 | 6970 | 3753 | 1050 |
| Example 39 | 48.89 | 10.84 | 10.46 | 28.51 | 0.69 | 0.47 | 0.14 | 150207 | 4110 | 1150 |
| Example 40 | 48.25 | 10.70 | 10.56 | 26.95 | 1.33 | 2.13 | 0.08 | 11388271 | 4682 | 1200 |
| Example 41 | 49.13 | 10.89 | 11.63 | 23.25 | 3.65 | 1.37 | 0.08 | 1626 | 2300 | 1000 |
| Example 42 | 48.32 | 10.70 | 12.25 | 22.04 | 5.46 | 1.15 | 0.08 | 308 | 2784 | 1000 |
| Example 43 | 47.25 | 10.47 | 13.05 | 20.50 | 7.81 | 0.87 | 0.05 | 939532 | 4546 | 1200 |
| Example 44 | 43.88 | 9.72 | 15.58 | 15.58 | 15.24 | 0.00 | 0.00 | 4398 | 3612 | 1050 |
| Example 45 | 48.44 | 10.74 | 17.42 | 8.70 | 8.21 | 6.14 | 0.35 | 1098 | 2493 | 1000 |
| Example 46 | 50.12 | 11.11 | 17.80 | 13.42 | 4.19 | 3.17 | 0.19 | 982 | 2978 | 1050 |
| Example 47 | 37.66 | 8.34 | 18.14 | 18.14 | 17.72 | 0.00 | 0.00 | 214021 | 4280 | 1150 |
| Example 48 | 51.76 | 11.47 | 18.38 | 18.39 | 0.00 | 0.00 | 0.00 | 74 | 1350 | 1000 |
| Example 49 | 51.62 | 11.44 | 18.57 | 9.27 | 2.19 | 6.54 | 0.37 | 292 | 1990 | 1000 |
| Example 50 | 48.79 | 10.83 | 18.82 | 0.00 | 9.11 | 11.81 | 0.66 | 149262125 | 5260 | 1200 |
| Example 51 | 51.72 | 11.46 | 19.95 | 0.00 | 3.76 | 12.38 | 0.70 | 68722325 | 4996 | 1200 |
| Example 52 | 21.86 | 7.14 | 20.26 | 0.00 | 30.61 | 19.06 | 1.08 | 20617 | 3608 | 1150 |
| Example 53 | 42.81 | 9.48 | 20.62 | 20.62 | 6.47 | 0.00 | 0.00 | 655807 | 4571 | 1200 |
| Example 54 | 42.29 | 9.37 | 20.63 | 10.31 | 9.72 | 7.27 | 0.41 | 2059706 | 4532 | 1200 |
| Example 55 | 53.68 | 11.89 | 20.71 | 0.00 | 0.00 | 12.99 | 0.73 | 6479534 | 4905 | 1200 |
| Example 56 | 44.43 | 9.85 | 21.68 | 10.83 | 5.15 | 7.64 | 0.42 | 1963495 | 4692 | 1200 |
| Example 57 | 41.53 | 13.56 | 22.00 | 10.99 | 0.00 | 7.75 | 4.17 | 216377 | 4120 | 1150 |

TABLE 2-continued

Composition and characteristic of manganese-nickel-zinc-cobalt-iron-titanium group metal oxide thermistor

| Examples | Composition (wt %) | | | | | | | Resistivity (25° C.) (ohm · cm) | B constant (°K.) | Sintering temperature (°C.) |
| --- | --- | --- | --- | --- | --- | --- | --- | --- | --- | --- |
| | a | b | c | d | e | f | g | | | |
| Example 59 | 21.93 | 7.16 | 30.49 | 0.00 | 0.00 | 38.26 | 2.16 | 60868 | 1441 | 1150 |
| Example 60 | 36.80 | 12.03 | 34.11 | 17.06 | 0.00 | 0.00 | 0.00 | 75595 | 3920 | 1150 |
| Example 61 | 21.92 | 7.16 | 40.63 | 0.00 | 0.00 | 28.67 | 1.62 | 85216 | 3983 | 1150 |
| Example 62 | 21.90 | 7.15 | 50.76 | 0.00 | 0.00 | 19.10 | 1.09 | 58905 | 3961 | 1150 |

Figure 2:
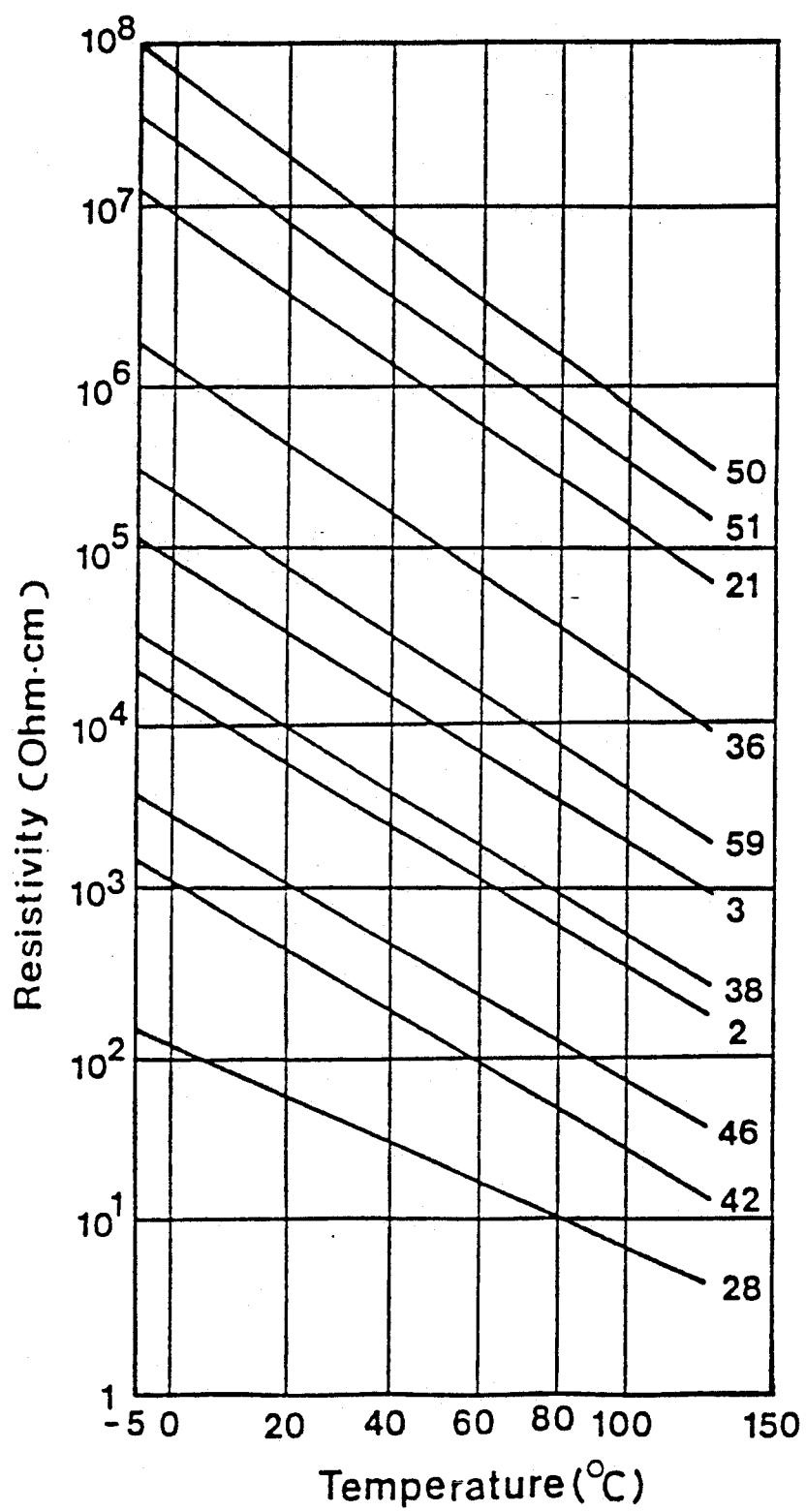
FIG. 2 is a graph illustrating the relationship of resistance-temperature response with respect to a preferred embodiment of the present invention.

FIG. 2 is a graph illustrating the relationship between resistance and temperature of the metal oxide group thermistor made from the composition of the examples of the present invention shown in above table 1 and table 2.

The metal oxide group thermistor of the present invention obtained through such manufacturing process bears a spinel structure, and it can be understood that even if iron oxide together with titanium oxide are added in considerable amount as shown in above table 1, they are sufficiently molten in solid state and thereby it is possible to manufacture an excellent thermistor having a wide resistance range.

Therefore, the metal oxide group thermistor material of the present invention has the advantage that whole or most of the expensive cobalt oxide is replaced by cheap iron oxide and titanium oxide and thereby not only can the manufacturing expense of thermistor be reduced but also the use of copper oxide which operates as a harmful substance upon manufacturing of the thermistor can be excluded so that safety of manufacturing workplace can be increased.

Also when copper oxide is added as shown in table 2, the added quantity of iron oxide and titanium oxide can be greatly changed, and therefore the resistance range can be widely controlled, and B constant can be raised.

On the other hand, the metal oxide group thermistor material of the present invention is a multiple ingredient composition, and since sintering is executed at 1000° C.-1200° C. by mutual eutectic reaction, the sintering temperature can be lowered as much as about 100° C.-250° C. relative to the sintering temperature of conventional manganese-nickel-cobalt-copper group thermistor, and therefore there is an advantage in that manufacturing expense of the thermistor can be reduced.

What is claimed is:

1. Metal oxide group thermistor material which is the result of firing an admixture consisting essentially of a $MnCO_3$+b $NiO$+c $CuO$+d $ZnO$+e $Co_3O_4$+f $Fe_2O_3$+g $TiO_3$ in the following ratio by weight:

$27.86 \leq a \leq 53.68$ $6.17 \leq b \leq 13.56$ $0 \leq c \leq 50.76$ $0 \leq d \leq 48.25$ $0 \leq e \leq 30.61$ $0 \leq f \leq 51.14$ provided that $a+b+c+d+e+f+g=100$ and $e+f+g \leq 54$.

2. Metal oxide group thermistor material according to claim 1 wherein:

$21.86 \leq a \leq 49.52$ $6.17 \leq b \leq 10.97$ $c = 0$ $0 \leq e \leq 8.97$ $5.08 \leq f \leq 51.14$ $0.29 \leq g \leq 3.08$.

3. Metal oxide group thermistor material of claim 1 wherein:

$21.86 \leq a \leq 53.86$ $7.14b \leq 13.56$ $0.44c \leq 50.76$ $0 \leq d \leq 35.05$ $0 \leq e \leq 30.61$ $0 \leq f \leq 38.26$ $0 \leq g \leq 7.71$.

* * * * *